United States Patent

Liu

[11] Patent Number: 5,147,946
[45] Date of Patent: Sep. 15, 1992

[54] VINYL ETHER SILOXANE COPOLYMERIC COMPOSITION

[75] Inventor: Kou-Chang Liu, Wayne, N.J.

[73] Assignee: ISP Investments Inc., Wilmington, Del.

[21] Appl. No.: 667,140

[22] Filed: Mar. 11, 1991

[51] Int. Cl.$^5$ .............................................. C08F 283/12
[52] U.S. Cl. ........................... 525/479; 526/279; 528/32; 528/25; 528/26; 522/99
[58] Field of Search ............... 526/279; 525/479; 528/32, 25, 26; 522/99

[56] References Cited

U.S. PATENT DOCUMENTS 4,617,238 10/1986 Crivello et al. ..................... 428/452
5,026,810  6/1991 Liu .......................................... 528/14

Primary Examiner—John C. Bleutge
Assistant Examiner—Margaret W. Glass
Attorney, Agent, or Firm—Marilyn J. Maue; Joshua J. Ward

[57] ABSTRACT

This invention relates to a copolymeric film forming and release coating comprising as active monomeric components between about 15 and about 40 weight percent of a cyclic polyvinyl compound of the formula:

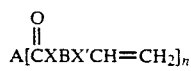

and between about 60 and about 85 weight % of a hydroxy containing vinyl ether siloxane of the formula

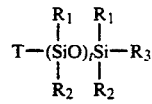

wherein A is a saturated or unsaturated cyclic moiety having a 5 to 8 membered ring; n has a value of from 3 to 8; X and X' are each individually oxygen, sulfur, or NR where R is hydrogen or lower alkyl; B is alkylene having from 2 to 20 carbon atoms or a $C_2$ to $C_3$ alkoxylated derivatives thereof; $R_1$ and $R_2$ are lower alkyl; t has a value of from 1 to 100;

T is $CH_2=CHO(YO)_mCH_2CH(OH)CH_2O-$

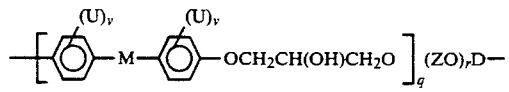

where Y is alkylene or alkylenephenylene optionally substituted with fluorine; m has a value of from 1 to 10; U is halo or loweralkyl; v has a value of from 0 to 4; M is $-CH_2-$ or

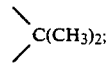

q has a value of from 0 to 20; Z is $C_2$ to $C_3$ alkylene; r has a value of from 0 to 20; D is alkylene or alkylenephenylene and $R_3$ is the same as T or is $C_1$ to $C_{20}$ alkyl. The invention also relates to the use of the above copolymers and to the copolymerizable composition.

8 Claims, No Drawings

VINYL ETHER SILOXANE COPOLYMERIC COMPOSITION

In one aspect the invention relates to a cyclic polysubstituted vinyl ether, amine or thioether/vinyl ether siloxane compositions which are copolymerizable to non-hydrolyzable, stain resistant coating materials for protecting the surface of various substrates. In another aspect the invention relates to coating a substrate with the present clear, water repellant, chemically resistant protective film.

BACKGROUND OF THE INVENTION

Various polymeric coating compositions possessing singular properties such as water repellancy, fade resistance, chemical resistance, scratch resistance or stiffening properties have been employed to coat various surfaces. However, many of these coating compositions are opaque or slightly colored so that color or pattern distortion is an inherent effect accompanying their beneficial properties. Also, few compositions are capable of combining all of the above desirable properties in a clear, colorless coating.

Accordingly, it is an object of this invention to provide a transparent, colorless film forming and coating of good adhesion which achieves exceptionally high resistance to abrasion, chemical attack and hydrolysis while minimizing color change of a coated substrate.

Another object is to provide a coating material which avoids matting and provides stain resistance when applied to a textile surface and which minimizes pilling of knapped fabrics.

Yet another object is to provide a composition which is polymerizable to a hard surface coating and which possesses exceptionally high chemical and stain resistance.

These and other objects and advantages to the present invention will become apparent from the following description and disclosure.

THE INVENTION

According to this invention there is provided a copolymerizable film forming composition comprising as active monomeric ingredients between about 15 and about 40 weight % of a cyclic polysubstituted vinyl compound having the formula:

$$A[CXBX'CH=CH_2]_n$$
$$\overset{O}{\underset{\|}{}}$$

and between about 60 and about 85 weight % of a vinyl ether siloxane having the formula:

$$T-(SiO)_t\overset{R_1}{\underset{R_2}{\overset{|}{\underset{|}{Si}}}}-R_3$$
$$\overset{R_1}{\underset{R_2}{}}$$

wherein A is a saturated or unsaturated cyclic moiety having a 5 to 8 membered ring; n has a value of from 3 to 8; X and X' are each individually oxygen, sulfur, or NR where R is hydrogen or lower alkyl and B is alkylene having from 2 to 20 carbon atoms or a $C_2$ to $C_3$ alkoxylated derivatives thereof; $R_1$ and $R_2$ are each lower alkyl; t has a value of from 1 to 100;

T is $CH_2=CHO(YO)_mCH_2CH(OH)CH_2O-$

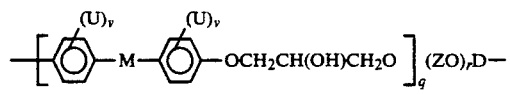

where Y is alkylene or alkylenephenylene optionally substituted with fluorine, m has a value of from 1 to 10; U is halo or lower alkyl; v has a value of from 0 to 4; M is $-CH_2-$ or

q has a value of from 0 to 20; Z is $C_2$ to $C_3$ alkylene; r has a value of from 0 to 20; D is alkylene or alkylenephenylene and $R_3$ is the same as T or is $C_1$ to $C_{20}$ alkyl. Preferred cyclic polyvinyl ethers are those wherein X and X' are each oxygen, A is a hydrocarbon ring having from 5 to 6 members and n has a value of from 3 to 6. The most preferred species of the polysubstituted vinyl ethers is the trivinyl ether of the formula:

$$C_6H_3(-\underset{\underset{O}{\|}}{C}OC_4H_8OCH=CH_2)_3$$

Examples of suitable A radicals include those derived from hydrocarbon radicals such as benzene, toluene, xylene, cyclopentane, cyclohexane, cycloheptane, cyclooctane, cyclopentene, cyclohexene, cycloheptene, cyclooctene, cyclohexadiene, cyclooctadiene, etc. as well as heterocyclic radicals such as those derived from pyrrole, pyridine, thiophene, thiopyran, thiapyrylium, thiepin, azepine, azocine, oxazole, furan, dioxazine, oxadithiane, pyrylium, etc.

More desirable species of the vinyl ether siloxanes are those wherein Y is $-(CH_2)_{2-6}$ or

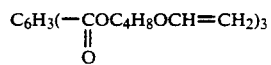

D is $C_2$ to $C_4$ alkylene; q has a value of from 1 to 10; t has a value of from 1 to 50; v is zero and $R_1$ and $R_2$ are methyl. Of this group, the most preferred siloxane is the compound having the formula:

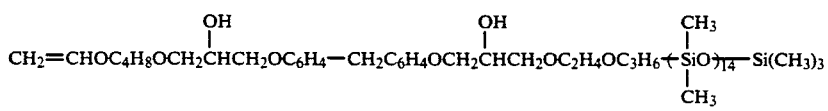

Specific examples of other vinyl ether siloxane components include

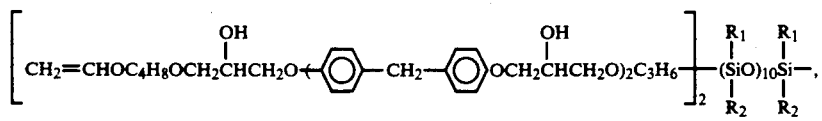
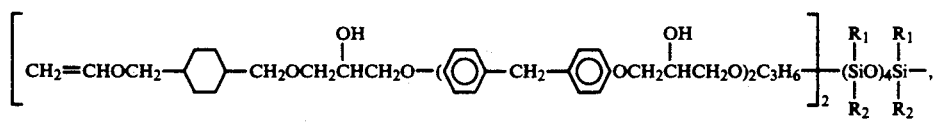
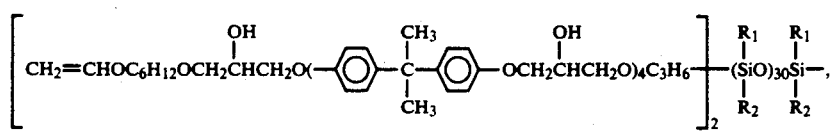
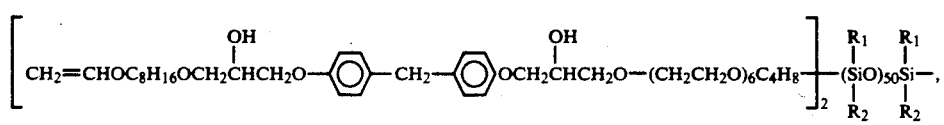
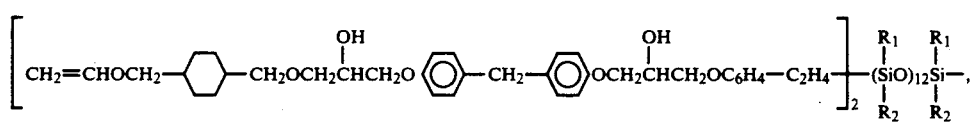
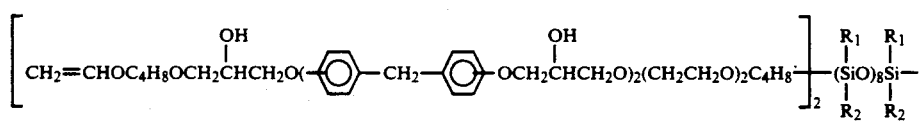
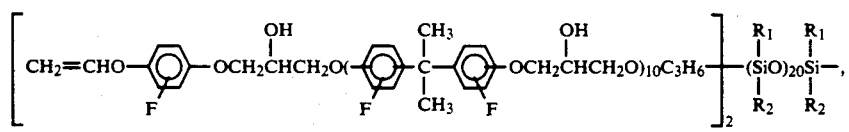
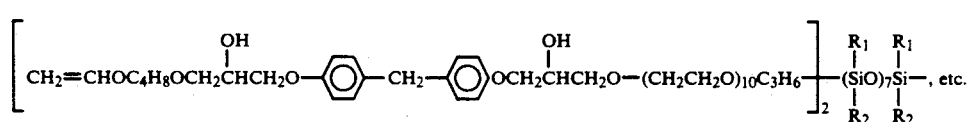
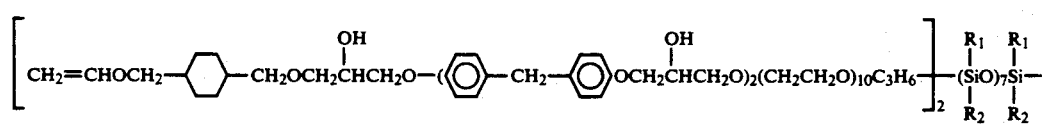
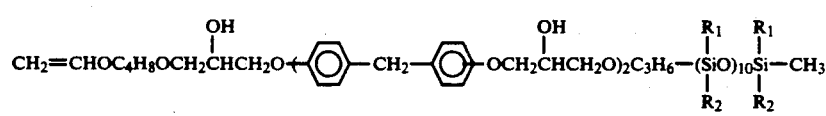
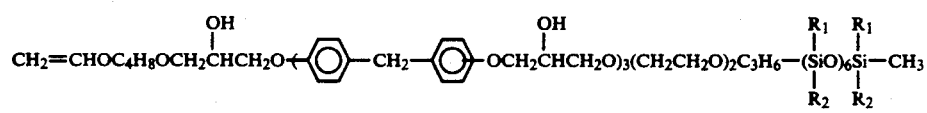
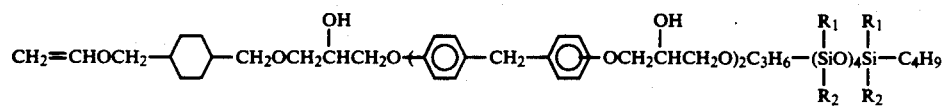

-continued

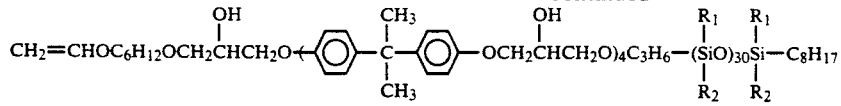

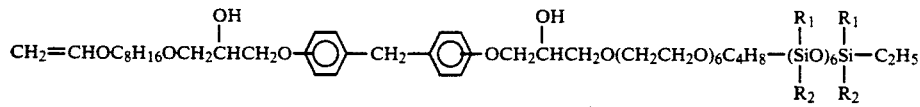

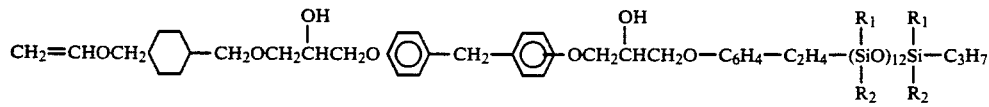

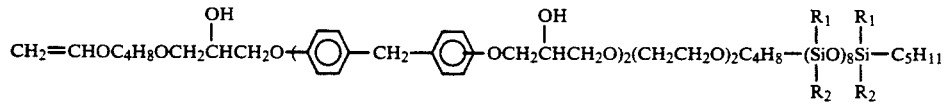

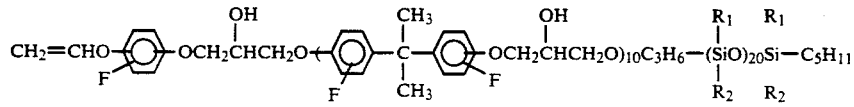

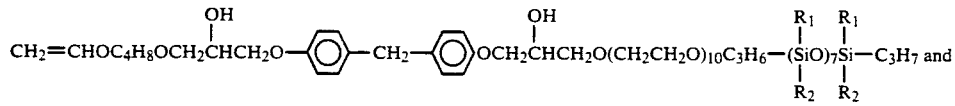

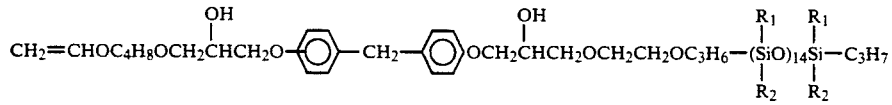

Both the polysubstituted vinyl ethers and the vinyl ether siloxanes are known. A detailed discussion of the siloxanes is found in my copending U.S. Pat. application Ser. Nos. 564,917 and 564,936 (now U.S. Pat. No. 5,026,810) both filed on Sep. 8, 1990.

In the present composition a mixture of from about 25 to about 35 wt. % of the polysubstituted vinyl ether, (component A), and from about 65 to about 75 wt. % of the vinyl ether siloxane, (component B), has been found to be most beneficial. Below 15% of component A, the composition lacks the desired chemical and abrasion resistance; whereas below 60% of component B, the resulting film fails to provide good release properties. The composition of this invention may also contain various adjuvants such as a surface active agent; solvent; colorant, when desired.

The solid copolymerizable composition of monomers is most often employed as a 20 to 60% mixture in a suitable solvent such as acetone, tetrahydrofuran, ethyl acetate, ethanol, etc. Preparation of the copolymerizable composition requires no particular order of addition and copolymerization is affected under relatively mild conditions, e.g. at a temperature of from about 5° C. to about 100° C. under atmospheric pressure. The copolymer can be coated and cured on a substrate at between about 20° C. and about 75° C. When radiation curing of the copolymeric mixture is desired, the composition also contains from about 0.05 to about 5 wt. %, preferably from about 0.1 to about 2 wt. %, of a cationic polymerization initiator; such as an onium salt, for example the triphenyl sulfonium salt of phosphorous hexafluoride, diphenyl iodium salt, tetrazolium chloride, phenyl onium salts or aryl alkyl onium salts and the like.

The above described monomeric composition can be then coated and dried on a substrate to a dry film thickness of from about 0.05 to about 20 mils, preferably from about 0.1 to about 8 mils. Suitable substrates include porous and non-porous surfaces such as glass; ceramic; metal; paper; wood, e.g. items of furniture; fabrics and textiles, e.g. carpets and rainwear, etc. Radiation curing of the present composition on a substrate is accomplished within a few seconds, most often within a period of less than one second, by exposure to a source of radiation such as UV light exposure at 100–1500 millijoules/cm², preferably from about 200 to about 600 millijoules/cm², or electron beam at from about 0.5 to about 20 megarads, preferably from about 1 to about 10 megarads, or lazer emission at equivalent exposure. Specific techniques for radiation curing are well known and require no further amplification.

The present compositions are also amenable to thermal polymerization in the presence of initiator at temperatures of from about 25° C. to about 200° C., preferably from about 50° C. to about 150° C.

The protective films formed on the substrate provide clear, hard finishes having exceptionally high resistance to abrasion and chemical attack from solvents, acids and bases. The present cyclic polyvinyl compounds, i.e. component A, having 3 or more functional groups provide cured copolymers of a highly branched structure. Because of the intricate branching, hard, rigid copolymers are produced which offer high resistance to fracture and exhibit extended durability and resistance to chemical attack which more linear polymeric coatings are unable to achieve. Since the copolymerizable composition also possesses sensitivity to radiation, it may also find use as a photoresist material which requires no protective coating.

Having thus described the invention reference is now had to the accompanying examples which illustrate preferred embodiments but which are not to be construed and limiting to the scope of the invention as more broadly defined above and in the appended claims.

EXAMPLE 1

In a glass beaker, 30 parts by weight of tris(4-vinyloxybutyl)1,3,5-benzenetricarboxylate is blended with 69 parts by weight of a hydroxylated vinyl polysiloxane having the formula

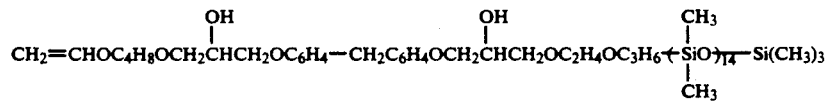

The mixture is stirred at room temperature for a period of 30 minutes during which 1 part by weight of the triphenyl sulfonium salt of phosphorous hexafluoride is added.

The resulting uniform viscous mixture is then coated and dried on an aluminum panel to a coating thickness of about 1.3 mils. The panel is subjected to a UV light exposure of 400 millijoules/cm$^2$ followed by a thermal bake at 177° C. for 10 minutes. The results of cross-cut tape test (ASTM D-3359-K-B) and a ketone solvent rub test are as reported in Table I.

For the solvent resistance test, methylethyl ketone saturated cheesecloth was rubbed across the surface of the coated panel under a constant pressure and the number of back and forth strokes needed to break through the coating is indicated.

EXAMPLE 2

Example 1 was repeated except that 26 parts by weight of tris(4-vinyloxybutyl)1,3,5-cyclohexyltricarboxylate is substituted for 30 parts of tris(4-vinyloxybutyl)1,3,5-benzenetricarboxylate and 73 parts by weight of the polysiloxane of the formula

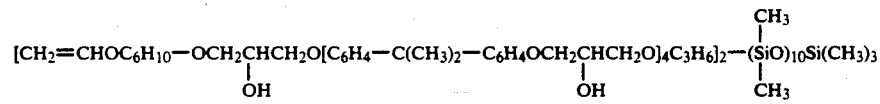

is substituted for the polysiloxane employed in Example 1.

The resulting viscous mixture is coated, dried and cured on an aluminum panel as described and the coating subjected to the above adhesion and ketone solvent rub tests. The results of these tests are also reported in Table I.

TABLE I

|  | Example 1 | Example 2 |
|---|---|---|
| Adhesion (ASTM D-3359-K-B) | excellent | excellent |
| Solvent Rub (No. of rubs before break-through) | >100 | >100 |

The above coated and cured panels show no deterioration or loss of adhesion after a 10 minute soak in base, namely a 10% sodium hydroxide solution or in acid, namely a 10% hydrochloric acid solution.

These examples demonstrate the exceptionally high resistance to chemical attack and superior adhesive properties of the present copolymeric coatings.

The polymerized product of the present compositions also improve and extend the efficacy of standard cleaning and finishing formulations such as a furniture or car wax. Effective amounts of between about 0.05 and about 10%, preferably between about 0.5 and about 3%, based on total formulation provide sheen and more durable resistance to chemical attack and abrasion.

What is claimed is:

1. The copolymerizable composition comprising a polymerization initiator and, as active film forming ingredients between about 15 and about 40 percent by weight of a cyclic polyvinyl ether having the formula

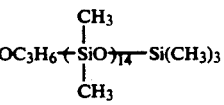

and between about 60 and about 85 percent by weight of a hydroxy containing vinyl ether siloxane of the formula

wherein A is a saturated or unsaturated cyclic moiety having a 5 to 8 membered ring; n has a value of from 3 to 8; X and X' are each individually oxygen, sulfur, or NR where R is hydrogen or lower alkyl; B is alkylene having from 2 to 20 carbon atoms optionally containing $C_2$ to $C_3$ alkoxylation; $R_1$ and $R_2$ are lower alkyl; t has a value of from 1 to 100;

T is $CH_2$=CHO(YO)$_m$CH$_2$CH(OH)CH$_2$O—

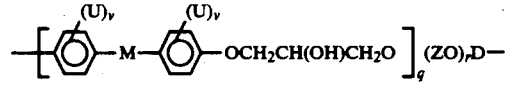

where Y is alkylene or alkylenephenylene optionally substituted with fluorine; m has a value of from 1 to 10; U is halogen or loweralkyl; v has a value of from 0 to 4; M is —CH$_2$— or

q has a value of from 0 to 20; Z is $C_2$ to $C_3$ alkylene; r has a value of from 0 to 20; D is alkylene or alkylenephenylene and $R_3$ is the same as T or is $C_1$ to $C_{20}$ alkyl.

2. The copolymerizable composition of claim 1 which additionally contains a surfactant.

3. The composition of claim 1 wherein A is a phenyl radical and X and X' are both oxygen.

4. The composition of claim 3 wherein the cyclic polyvinyl ether is

5. The composition of claim 1 wherein Y is —(CH$_2$)$_{2-6}$ or

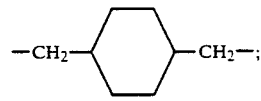

D is C$_2$ to C$_4$ alkylene; q has a value of from 1 to 10; t has a value of 1 to 50; v is zero and R$_1$ and R$_2$ are methyl.

6. The composition of claim 5 wherein the siloxane has the formula

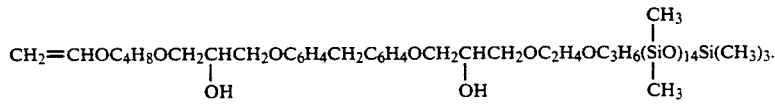

7. A substrate having an effective stain and chemically resistant coating of the copolymerized composition of any one of claims 1-6.

8. A wax formulation containing an effective wood or metal surface protective amount of the copolymerized composition of any one of claims 1-6.

* * * * *